United States Patent [19]

Maier

[11] Patent Number: 4,872,712

[45] Date of Patent: Oct. 10, 1989

[54] FLANGE CONNECTION

[75] Inventor: Hans P. Maier, Schwenningen, Fed. Rep. of Germany

[73] Assignee: Agintec AG, Pfaffikon, Switzerland

[21] Appl. No.: 176,343

[22] Filed: Mar. 31, 1988

Related U.S. Application Data

[62] Division of Ser. No. 896,646, Aug. 15, 1986, Pat. No. 4,735,445.

[30] Foreign Application Priority Data

Aug. 31, 1985 [DE] Fed. Rep. of Germany ....... 3531191
Feb. 13, 1986 [DE] Fed. Rep. of Germany ....... 3604467

[51] Int. Cl.$^4$ .................. F16L 19/08; F16L 21/06
[52] U.S. Cl. ................... 285/341; 285/364; 285/414; 285/910
[58] Field of Search ............ 285/341, 363, 364, 368, 285/414, 340, 910

[56] References Cited

U.S. PATENT DOCUMENTS

| | | | |
|---|---|---|---|
| 521,437 | 6/1894 | Friede | 285/341 |
| 813,454 | 2/1906 | Schaad | 285/910 |
| 1,477,696 | 6/1922 | Dollman | |
| 1,905,324 | 4/1933 | Waters | 285/363 |
| 2,191,044 | 2/1940 | Seligman | 285/910 |
| 2,330,425 | 12/1941 | Hilton | 285/139 |
| 2,632,942 | 2/1950 | Berg et al. | 29/148.2 |
| 2,900,199 | 8/1959 | Logan | 285/363 |
| 3,189,371 | 6/1965 | Swan | 285/341 |
| 3,775,832 | 12/1973 | Werra | 29/450 |
| 4,480,861 | 11/1984 | Cann, Jr. | 285/368 |
| 4,568,112 | 2/1986 | Bradley, Jr. et al. | 285/368 |
| 4,735,445 | 4/1988 | Maier | 285/341 |

FOREIGN PATENT DOCUMENTS

| | | |
|---|---|---|
| 455752 | 9/1971 | Australia . |
| 386586 | 12/1923 | Fed. Rep. of Germany . |
| 1162140 | 1/1964 | Fed. Rep. of Germany . |
| 3206570 | 1/1983 | Fed. Rep. of Germany . |
| 37721 | 1/1931 | France ............... 285/341 |
| 1496382 | 9/1967 | France . |
| 1583060 | 10/1969 | France . |
| 2107514 | 5/1972 | France . |
| 6891 | of 1887 | United Kingdom . |

OTHER PUBLICATIONS

P. I. Orlow, "Basics of Contruction", M. Maschinostrojenije, 1977, pp. 183, 213.
A. G. Komissar, "Seal Devices for Rollers", M. Maschinostrojenije, 1980, p. 182.

Primary Examiner—Randolph A. Reese
Assistant Examiner—Anthony Knight
Attorney, Agent, or Firm—Foley & Lardner, Schwartz, Jeffery, Schwaab, Mack, Blumenthal & Evans

[57] ABSTRACT

The invention relates to a flange connection for two components, in particular for containers, pipes or the like, with each of the two components having a flange which can be fastened against one another by fastening means and enclose between them a sealing body gripping over the connecting joint between the two components. Each flange, in its end face facing toward the connecting joint, has an annular sealing chamber which widens conically toward the connecting joint and into which a sealing body of annular configuration is positioned. The flanges, when fstened, bear against one another at the end face and together form a sealing chamber which is approximately triangular in cross-section and is virtually completely filled by the sealing body deformed by the fastening.

10 Claims, 3 Drawing Sheets

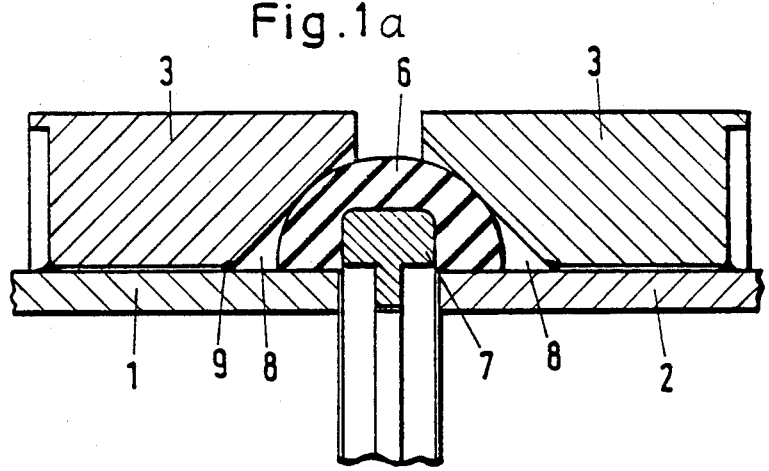
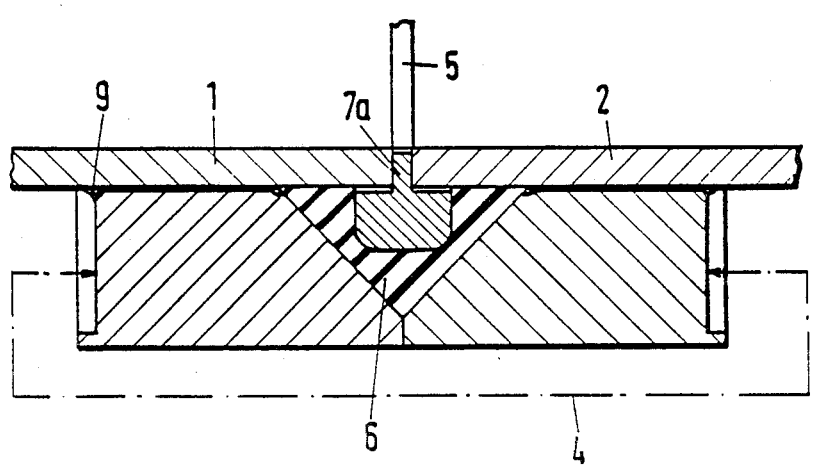

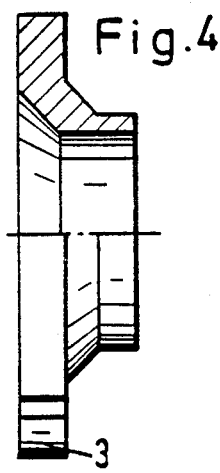
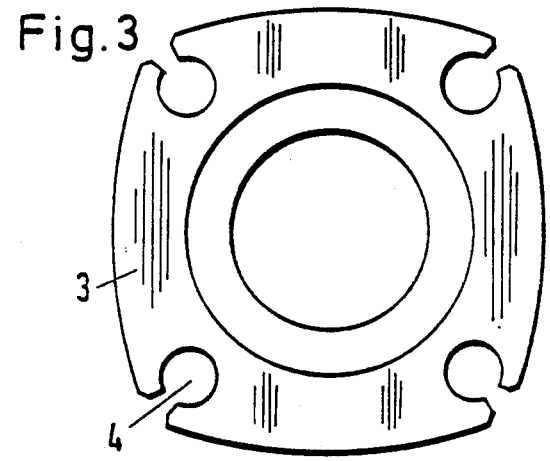
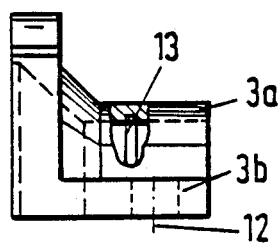
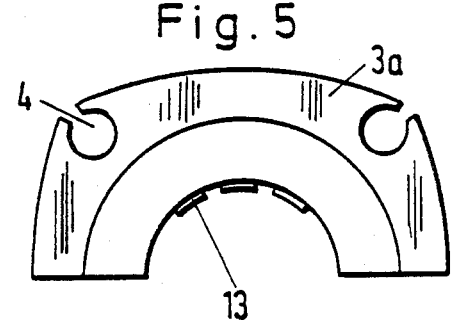
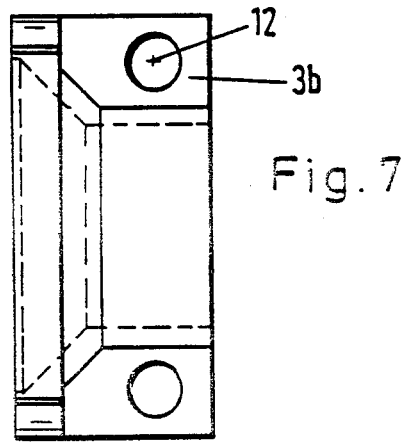

FLANGE CONNECTION

This is a division of application Ser. No. 896,646, filed Aug. 15, 1986 now U.S. Pat. No. 4,735,445.

BACKGROUND OF THE INVENTION

The invention relates to a flange connection for two components, in particular for containers, pipes or the like, with each of the two components having a flange which can be fastened against one another by fastening means and enclose between them a sealing body gripping over the connecting joint between the two components.

Containers, apparatus, pipelines and the like are mostly sealed on the basis of the flat seal principle and fastened by rounded and butt-welded flange rings. This type of sealing and connection is mechanically complicated and accordingly expensive and requires very high forces for constructing the sealing function via the flat seal, which forces in turn necessitate large flange ring cross-sections and also a large number of fastening elements.

SUMMARY OF THE INVENTION

The object of the invention is to design the flange connection which is simple in construction and provides a superior sealing function.

The object is achieved according to the invention in that each flange, in its end face facing toward the connecting joint, has an annular sealing chamber which widens conically toward the connecting joint and into which the sealing body of annular configuration is contained at the end face, with the flanges, having been fastened, bearing against one another at the end face and together forming a sealing chamber which is approximately triangular in cross-section and is virtually completely filled by the sealing body deformed by the fastening.

The flange connection according to the invention is particularly suitable for containers, apparatus and pipelines having a larger nominal diameter. The cross-sections for the flange profiles can be of a smaller size and accordingly lighter. The number of fastening means can be reduced, in which case segmental clamping screws, for example, can be used as the fastening means, which segmental clamping screws are commercially available and offered by the company Walter G. Rathmann.

The sealing body preferably consists of an elastomeric ring which has an inwardly open annular groove into which an inner ring is embedded which preferably sits loosely in the elastomeric ring and can have an inner annular collar which projects as a stop between the two components.

As a result of the conical design of the sealing chambers, a pressure is exerted on the sealing body in the axial and radial direction when the two flanges are pressed against one another. Since the inner ring in each case rests loosely in the annular groove of the elastomeric ring, the working pressure of the medium intensifies the sealing effect of the elastomeric ring.

It is expedient, in particular for connecting components of larger nominal diameter, if the flanges are portions of endless profiled material which are bent round, and also the elastomeric ring as well as the inner ring in each case represent portions of endless profiled strips.

In the new flange connection, it is possible for the two flanges to be welded to the component allocated in each case. It is advantageous in this embodiment that the welds are not tight but only need to absorb connecting forces.

However, it is also possible in the connecting principle according to the invention for each flange to be pushed loosely onto the allocated component and, in its end face facing away from the sealing chamber, to have a clamping chamber into which at least one annular clamping element is pushed. The clamping element is supported on the component with a radially inwardly located clamping edge, is gripped over by a clamping surface of the clamping chamber with respect to its radially outwardly located clamping edge, and projects out of the clamping chamber in the axial direction in such a way that a compressive force applied by the fastening means and acting axially on the clamping element leads to an increase in the outside diameter and a decrease in the inside diameter of the clamping element.

The abovementioned annular clamping element can be made up of individual annular segments.

The abovementioned inner annular collar of the inner ring is preferably not provided in the case of large and therefore heavy components. The inner ring is then made without stop.

Further embodiments of the invention are described in greater detail below, together with further advantages of the invention with reference to exemplary embodiments.

BRIEF DESCRIPTION OF THE DRAWINGS

Some exemplary embodiments of the invention which serve as examples are shown in the application drawings, in which:

FIG. 1a shows a welded flange connection in longitudinal section before fastening of the flanges;

FIG. 1is a view similar to FIG. 1a, with the flanges being shown in their fastened position;

FIG. 3 shows a modified embodiment of a mounton welded flange in plan view;

FIG. 4 shows the flange according to FIG. 3 in cross-section and side view;

FIG. 5 is an end view of the flange embodiment shown in FIG. 3;

FIG. 6 shows the flange segment according to FIG. 5 in side view and partly in cross-section;

FIG. 7 is an end view of the flange segment according to FIGS. 5 and 6, and

FIG. 8 shows an annular disk in cross-section.

DETAILED DESCRIPTION OF THE PREFERRED EMBODIMENTS

Figure 2A:
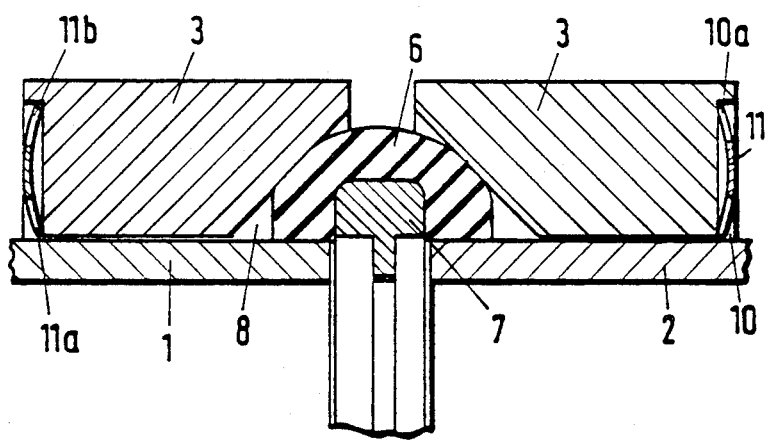
FIG. 2a is a longitudinal sectional view similar to FIG. 1a, showing a modified embodiment of the invention, and wherein the flanges are not connected.

The flange connections shown in FIGS. 1a, 1b, 2a and 2b for two components 1 and 2 have in each instance two flanges 3 which are fastened against one another by fastening means 4. These fastening means are in each case indicated only by a chain-dotted line in FIGS. 1a and 2a, and can advantageously be segmental clamping screws. The two flanges 3 enclose between them a sealing body which grips over the connecting joint 5 between the two components 1 and 2 and consists of an elastomeric ring 6 which has an inwardly open annular groove into which an inner ring 7 is embedded. The latter has an inner, annular collar 7a which projects as a stop between the two components 1 and 2.

Each flange 3, in its end face facing toward the connecting joint 5, has an annular sealing chamber 8 which widens conically toward the connecting joint and into which the sealing body 6 and 7 is positioned. It can be seen from FIGS. 1b and 2a that, after the two flanges are fastened, they bear against one another at the end face and together form a sealing chamber which is approximately triangular in cross-section and is virtually completely filled by the sealing body 6 and 7, deformed by the fastening operation.

In the flange connection according to FIGS. 1a and 1b, the two flanges 3 are welded to the associated components 1 and 2, with it not being necessary for the welds 9 to be tight, because they merely absorb connecting forces.

Figure 2B:
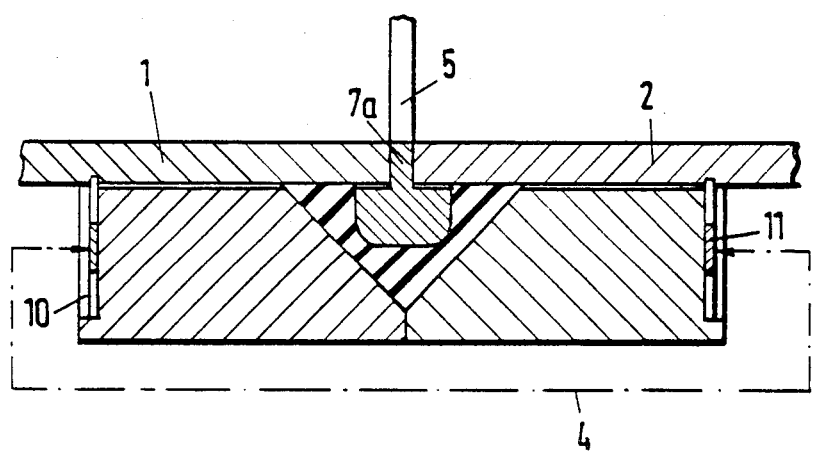
FIG. 2b is a view similar to FIG. 2a, showing the flanges connected.

In the embodiment shown in FIGS. 2a and 2b, each flange 3 is pushed loosely onto the associated components 1 and 2, respectively and, the end face of each flange facing away from the sealing chamber 8 has a clamping chamber 10 into which at least one annular clamping element 11 is positioned. The latter is supported on the components 1 and 2, respectively, with a radially inwardly lying clamping edge 11a and, with respect to its radially outwardly lying clamping edge 11b, is gripped over by a clamping surface 10a of the clamping chamber 10. It can further be seen from FIG. 2a that the clamping element 11 projects out of the clamping chamber 10 in the axial direction in such a way that a compressive force applied by the fastening means 4 and acting axially on the clamping element 11 leads to an increase in the outside diameter and a decrease in the inside diameter of the clamping element 11. When the fastening means 4 are tightened, the annular clamping elements 11 are pressed against the rear of the respective clamping chamber 10, with the inner clamping edge 11a pressing slightly into the circumference of the components 1 and 2, respectively (see FIG. 2a).

FIGS. 3 and 4 show a modified embodiment for a mount-on welded flange. The fastening means 4 fastening these flanges 3 against one another can be formed by a normal bolted flange connection.

According to FIGS. 5, 6, and 7, at least one of the two flanges can be made up from at least two flange segments 3a. Shown is a flange segment 3a which is made as a half shell and is provided with two axially running flange edges 3b which, when the flange connection is assembled, are pressed by fastening means diagrammatically shown at 12 against corresponding flange edges 3b of the associated flange segment 3a. The fastening means 12 can again be a bolted connection. Making up a flange from three or four flange segments is also conceivable.

It can be seen from FIGS. 5 and 6 that a thrust ring segment 13 is inserted into the inner circumference of each flange segment 3a, which circumference faces toward the component. This segment is intended to increase the frictional connection between the flange segment 3a and the outer circumferences of the associated components 1 and 2, respectively. The thrust ring segment 13 can be made, for example, of cemented carbide and can be of sawtooth like configuration, as can be seen in FIG. 5. In this case, a positive connection to the outer circumference of the associated component also results.

According to the invention, in order to avoid damaging the elastomeric ring 6 when the individual flange segments 3a are fastened together, a conical annular disk 14 adapted to the inner contour of the sealing chamber 8, and covering the sealing body 6 and 7 at the end face, can be pushed at least into the sealing chamber 8 of a split flange 3, which annular disk 14 is shown in FIG. 8.

Instead of the thrust ring segment 13 or else in addition, the clamping element 11 shown in FIGS. 2a and 2b can be provided with an associated clamping chamber 10 as previously described.

What is claimed is:

1. A flange connection for two components having a connection joint such as containers, pipes and the like, comprising:
    (a) flange means comprising a pair of flanges positioned over said components, for holding said components axially together at the connecting joint, said flange means having a pair of end faces each defining an annular recess which widens conically in the direction of said connecting joint to thereby form, together with the outside circumference of said components, an annular sealing chamber generally triangular in cross-section,
    (b) a resilient sealing body positioned within said annular sealing chamber and adapted to surround the connecting joint between said components, said resilient sealing body having a substantially semicircular radial cross-section in an undeformed condition and comprising an elastomeric ring which has an inwardly open annular groove and an inner ring which sits loosely in said annular groove, and
    (c) means for fastening said flanges so that a portion of their end faces are contiguous to each other, said flanges when in such fastened position defining said annular sealing chamber, said resilient sealing body being deformed by said fastening to substantially completely fill said sealing chamber thereby sealing the connecting joint wherein said flange means comprises a pair of flanges each of which is pushed loosely onto the associated component and, in its end face facing away from the sealing chamber, has a clamping chamber, said fastening means comprising at least one annular clamping element positioned in said clamping chamber, said clamping element being supported on the component by means of a radially inwardly located clamping edge which engages said component during fastening, and by a radially outwardly clamping edge which engages a clamping surface of the clamping chamber, said clamping element projecting out of the clamping chamber in the axial direction in such a way that a compressive force applied by the fastening means and acting axially on the clamping element leads to an increase in the outside diameter and a decrease in the inside diameter of the clamping element, said inner ring sitting loosely in a manner to permit working pressure in a medium inside said components to intensify sealing of said elastomeric ring in said sealing chamber.

2. The flange connection as claimed in claim 1, wherein said sealing body comprises endless profiled strips formed into an annular configuration.

3. The flange connection as claimed in claim 1, wherein said flanges abut one another at the apex of said sealing chamber in the fastened condition.

4. The flange connection according to claim 1, wherein said flange means comprises two flanges at least one of which is made up of at least two split segments.

5. A flange connection for two components having a connection joint such as containers, pipes and the like, comprising:
   (a) flange means comprising a pair of flanges positioned over said components, for holding said components axially together at the connecting joint, said flange means having a pair of end faces each defining an annular recess which widens conically in the direction of said connecting joint to thereby form, together with the outside circumference of said components, an annular sealing chamber generally triangular in cross-section,
   (b) a resilient sealing body positioned within said annular sealing chamber and adapted to surround the connecting joint between said components, said resilient sealing body having a substantially semi-circular radial cross-section in an undeformed condition and comprising an elastomeric ring which has an inwardly open annular groove and an inner ring which sits loosely in said annular groove, and
   (c) means for fastening said flange so that a portion of their end faces are contiguous to each other, said flanges when in such fastened position defining said annular sealing chamber, said resilient sealing body being deformed by said fastening to substantially completely fill said sealing chamber thereby sealing the connecting joint wherein said flange means comprises two flanges at least one of which is made up of at least two split flange segments and said inner ring sits loosely in a manner to permit working pressure in a medium inside said components to intensify sealing of said elastomeric ring in said sealing chamber.

6. The flange connection as claimed in claim 5, wherein the flange segments have axial flange edges which are pressed against one another by fastening means.

7. The flange connection as claimed in claim 5, wherein a thrust ring segment is inserted into the inner circumference of each flange segment, which circumference faces toward the associated component.

8. The flange connection as claimed in claim 5, further including a conical annular disk positioned in said sealing chamber to cover said end faces of said split flange segments and enclose said sealing body.

9. The flange connection as claimed in claim 5, wherein said sealing body comprises endless profiled strips formed into an annular configuration.

10. The flange connection as claimed in claim 5, wherein said flanges abut one another at the apex of said sealing chamber in the fastened condition.

* * * * *